(12) United States Patent
Guo

(10) Patent No.: US 12,038,597 B2
(45) Date of Patent: Jul. 16, 2024

(54) LIGHT-GUIDE TYPE DISPLAY DEVICE AND METHOD OF POSITIONING LIGHT GUIDE PLATE

(71) Applicant: SONY CORPORATION, Tokyo (JP)

(72) Inventor: Wenxiao Guo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 561 days.

(21) Appl. No.: 17/250,778

(22) PCT Filed: Aug. 26, 2019

(86) PCT No.: PCT/JP2019/033287
§ 371 (c)(1),
(2) Date: Mar. 3, 2021

(87) PCT Pub. No.: WO2020/054377
PCT Pub. Date: Mar. 19, 2020

(65) Prior Publication Data
US 2021/0311321 A1    Oct. 7, 2021

(30) Foreign Application Priority Data

Sep. 12, 2018   (JP) .................................. 2018-170652

(51) Int. Cl.
*F21V 8/00*   (2006.01)
*G02B 27/01*  (2006.01)

(52) U.S. Cl.
CPC ....... *G02B 6/0088* (2013.01); *G02B 27/0176* (2013.01); *G02B 2027/0178* (2013.01)

(58) Field of Classification Search
CPC .. G02B 6/0081; G02B 6/0086; G02B 6/0088; G02B 27/017; G02B 27/0172; G02B 27/0176; G02F 1/133524
See application file for complete search history.

(56) References Cited

U.S. PATENT DOCUMENTS

| 5,912,769 A | 6/1999 | Iizuka et al. |
| 2006/0007367 A1* | 1/2006 | Cho .................. G02F 1/133308 349/58 |

(Continued)

FOREIGN PATENT DOCUMENTS

| CN | 102472893 A | 5/2012 |
| CN | 203825293 U | 9/2014 |

(Continued)

OTHER PUBLICATIONS

English translation of written opinion for PCT/JP2019/033287, dated Oct. 21, 2019. (Year: 2019).*

(Continued)

*Primary Examiner* — Michael Stahl
(74) *Attorney, Agent, or Firm* — CHIP LAW GROUP

(57) ABSTRACT

A light-guide type display device that includes a light guide plate that optically guides an image to a pupil of a viewer, and a support member that supports the light guide plate and is provided with two fixing members. The light guide plate includes a first opening section that has a first opening having a long axis and a short axis, and a second opening section that has a second opening having a shape different from that of the first opening and located on a line that passes through the first opening section and that is parallel to a long-axis direction of the first opening section. Each of the two fixing members is inserted into a corresponding one of the first opening section and the second opening section.

16 Claims, 9 Drawing Sheets

(56) References Cited

U.S. PATENT DOCUMENTS

| | | | | |
|---|---|---|---|---|
| 2009/0097277 | A1* | 4/2009 | Iwasaki | G02B 6/0091 |
| | | | | 362/628 |
| 2009/0103328 | A1* | 4/2009 | Iwasaki | G02B 6/0088 |
| | | | | 362/617 |
| 2012/0169573 | A1 | 7/2012 | Billon et al. | |
| 2012/0320630 | A1* | 12/2012 | Shimizu | G02B 6/0091 |
| | | | | 362/611 |
| 2014/0139927 | A1 | 5/2014 | Hiraide | |
| 2014/0232619 | A1* | 8/2014 | Hiraide | G02B 27/0176 |
| | | | | 345/8 |
| 2014/0301108 | A1* | 10/2014 | Mineura | G02B 6/0043 |
| | | | | 362/615 |
| 2015/0277125 | A1 | 10/2015 | Hirano et al. | |

FOREIGN PATENT DOCUMENTS

| | | | |
|---|---|---|---|
| CN | 104950442 | A | 9/2015 |
| EP | 2452223 | A1 | 5/2012 |
| EP | 2924490 | A2 | 9/2015 |
| FR | 2947921 | A1 | 1/2011 |
| JP | 09-73005 | A | 3/1997 |
| JP | 2001-221940 | A | 8/2001 |
| JP | 2002-250915 | A * | 9/2002 |
| JP | 2014-092696 | A | 5/2014 |
| JP | 2015-184560 | A | 10/2015 |
| JP | 2015-184561 | A | 10/2015 |
| JP | 2018-011223 | A | 1/2018 |
| KR | 1020050005166 | A * | 1/2005 |
| WO | 2011/004089 | A1 | 1/2011 |

OTHER PUBLICATIONS

International Search Report and Written Opinion of PCT Application No. PCT/JP2019/033287, dated Oct. 21, 2019, 09 pages of ISRWO.

* cited by examiner

[ FIG. 1A ]
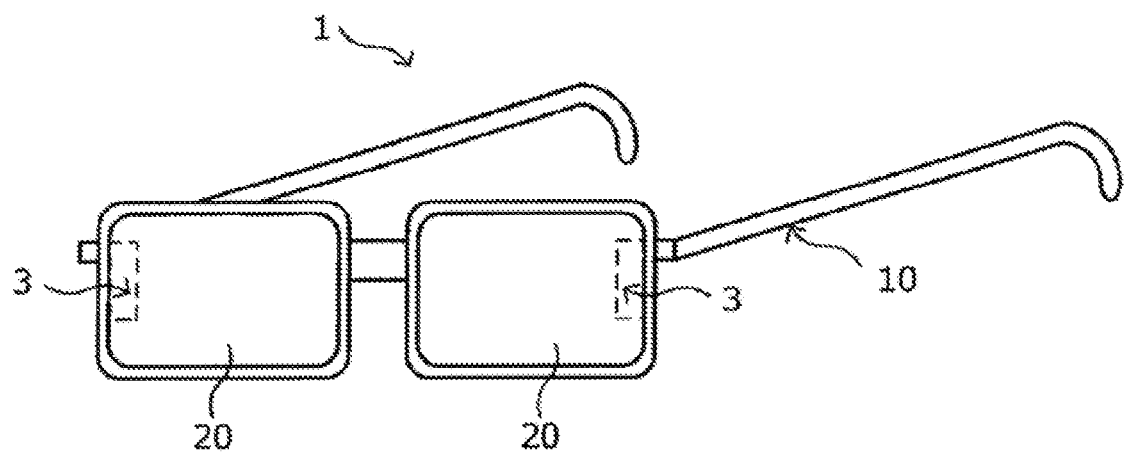
[ FIG. 1B ]
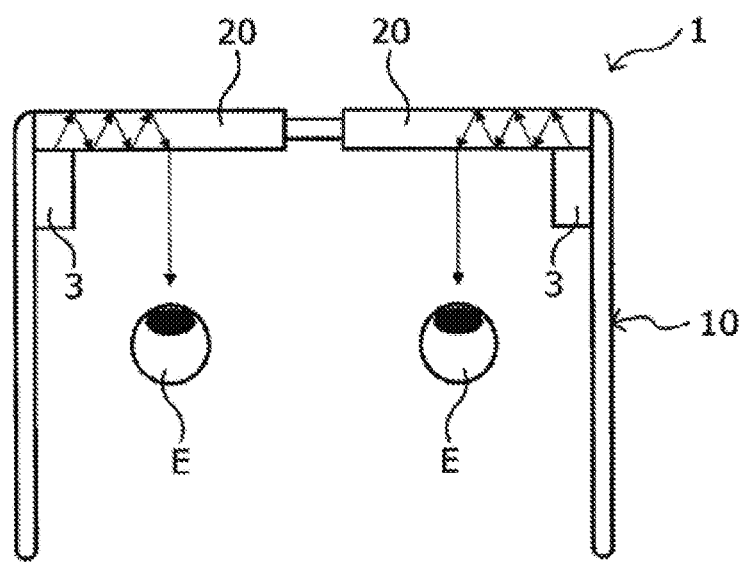

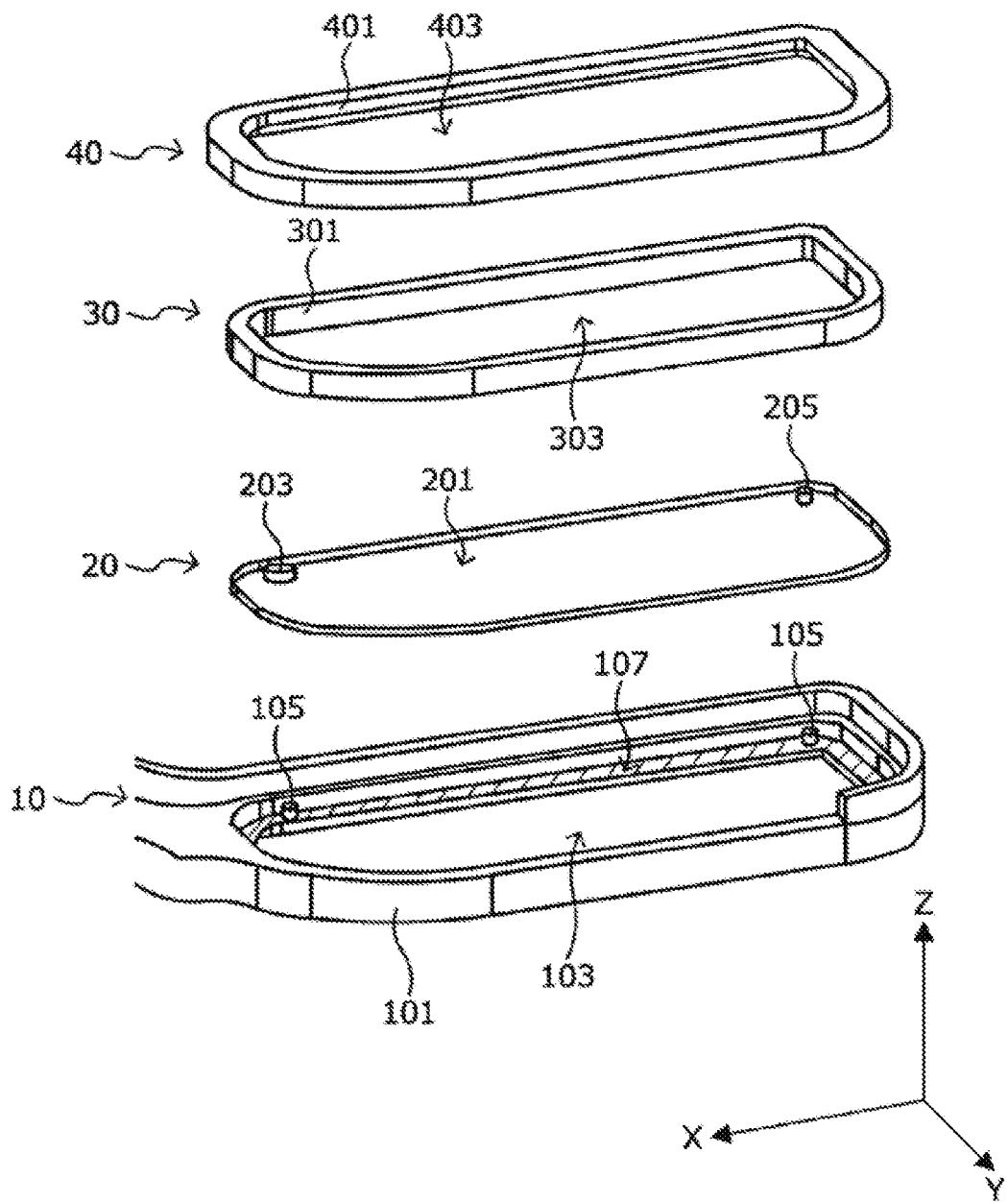

[ FIG. 3 ]
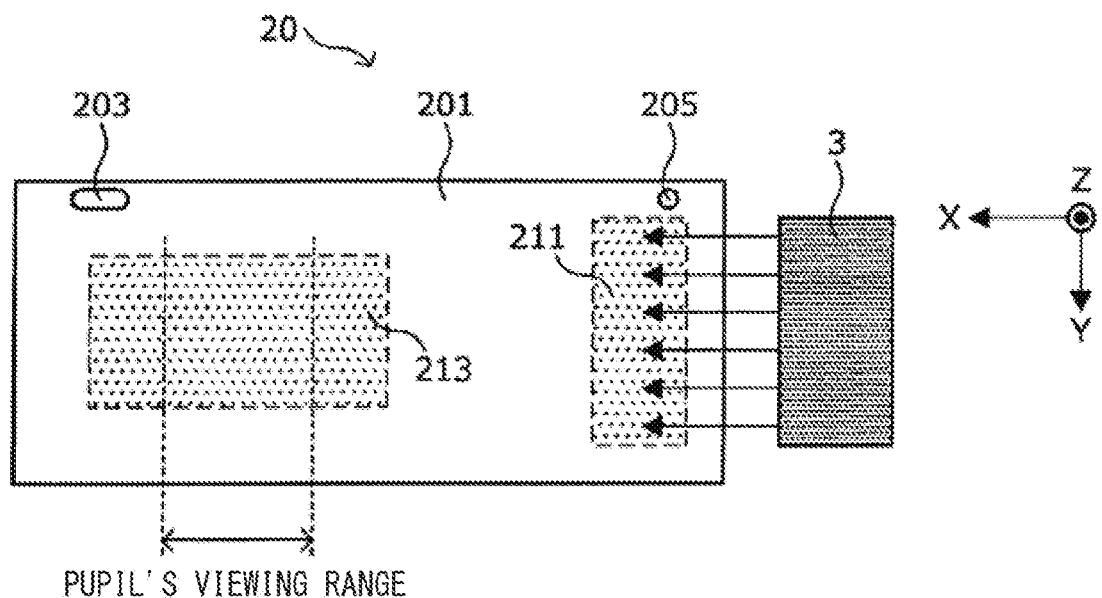
[ FIG. 4 ]
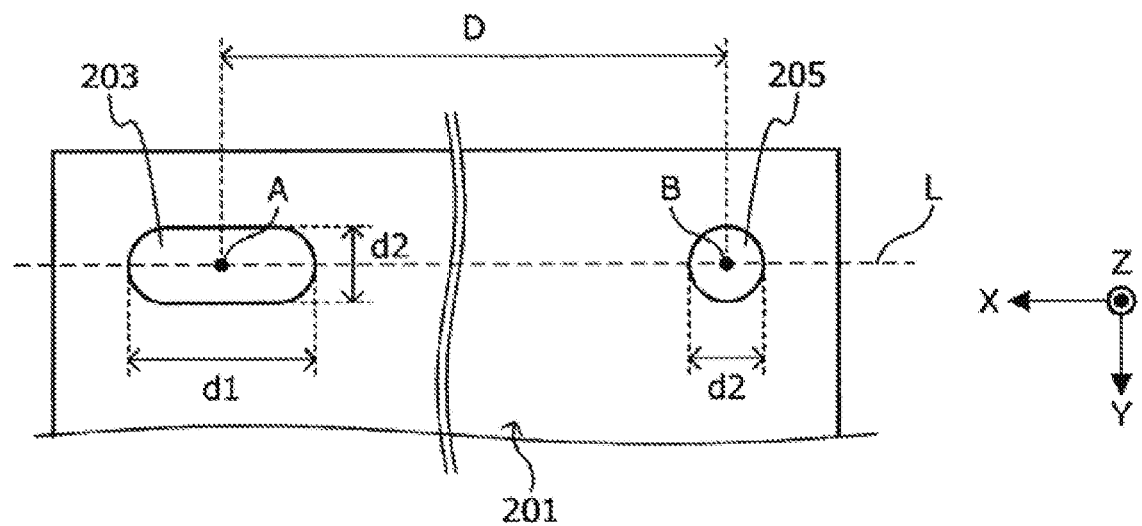

[ FIG. 5 ]
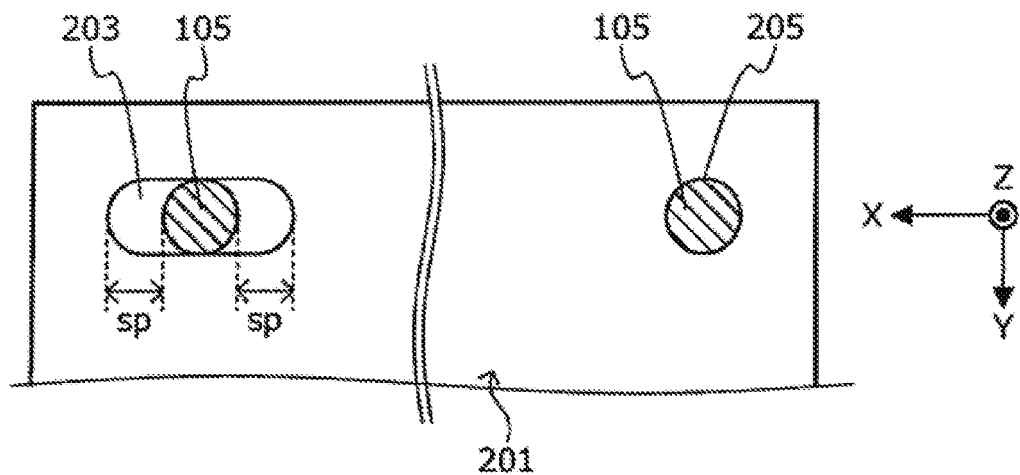
[ FIG. 6 ]
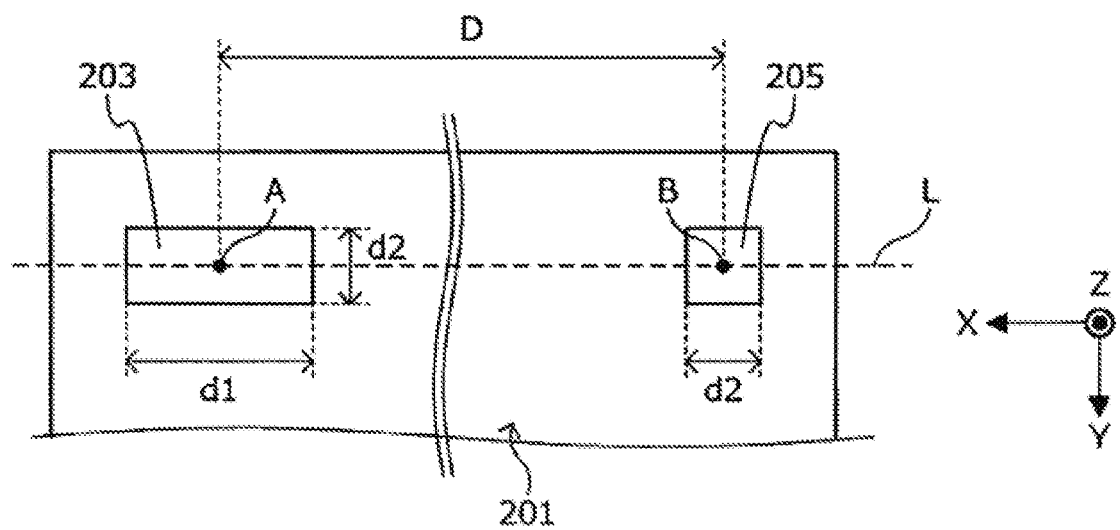

[ FIG. 7 ]
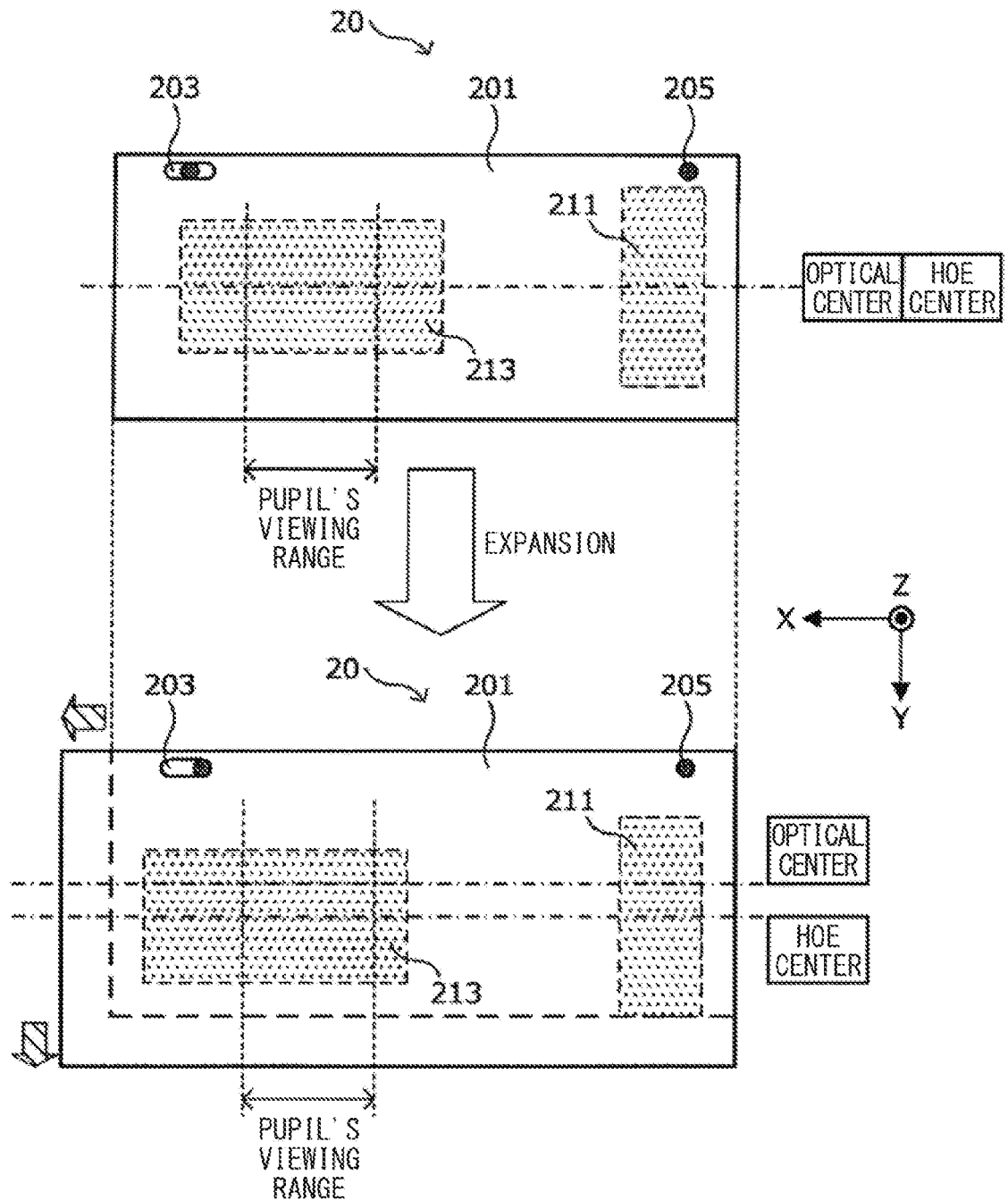

[FIG. 8]
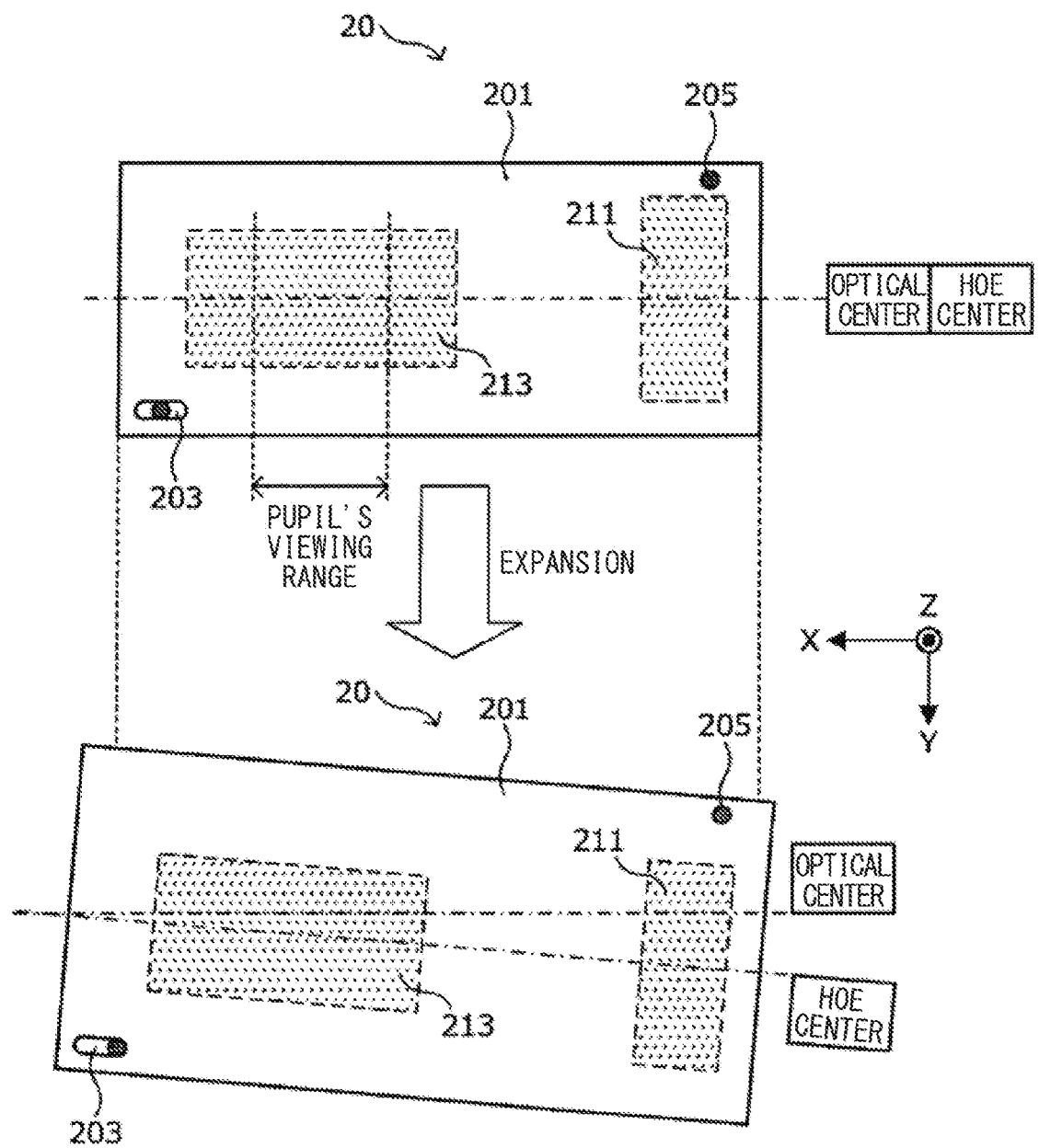

[ FIG. 9A ]
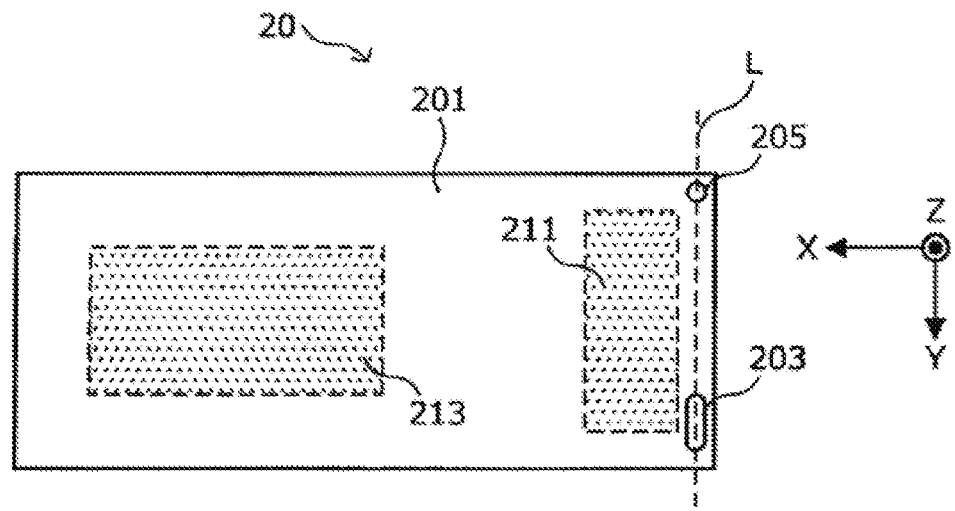
[ FIG. 9B ]
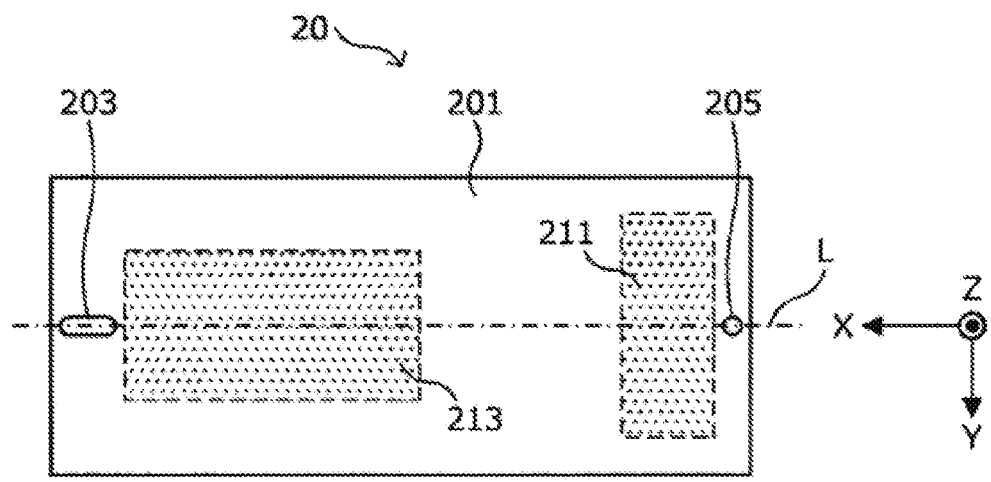

[ FIG. 9C ]
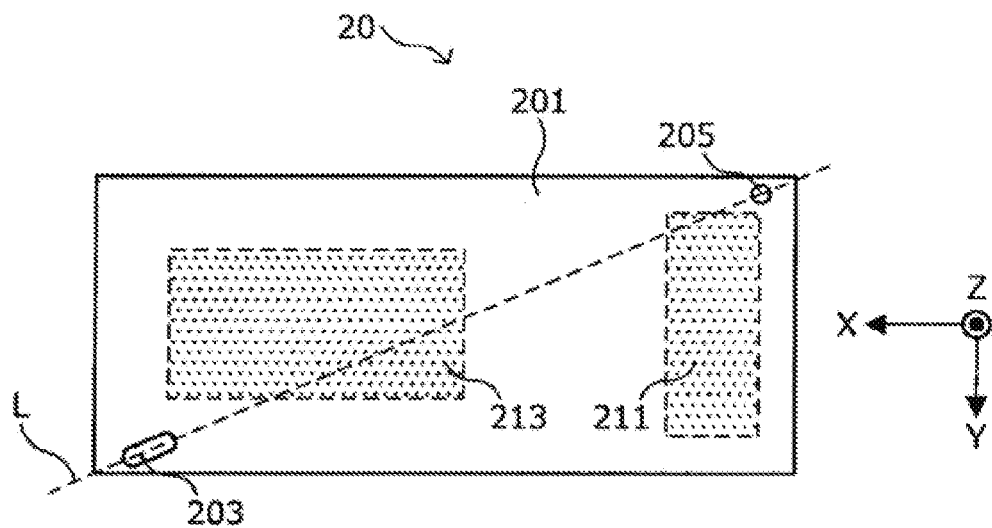
[ FIG. 10 ]
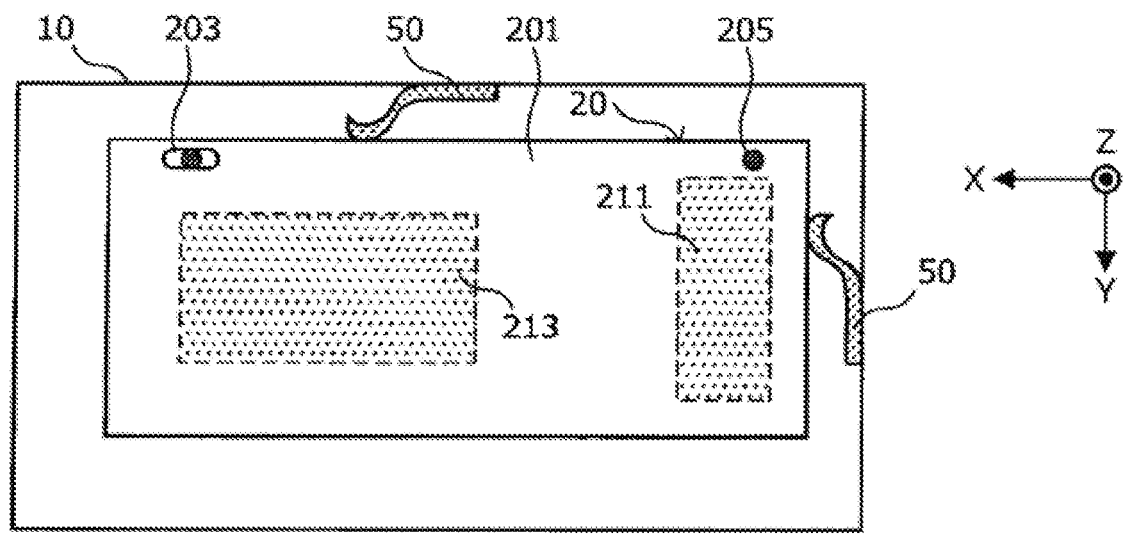

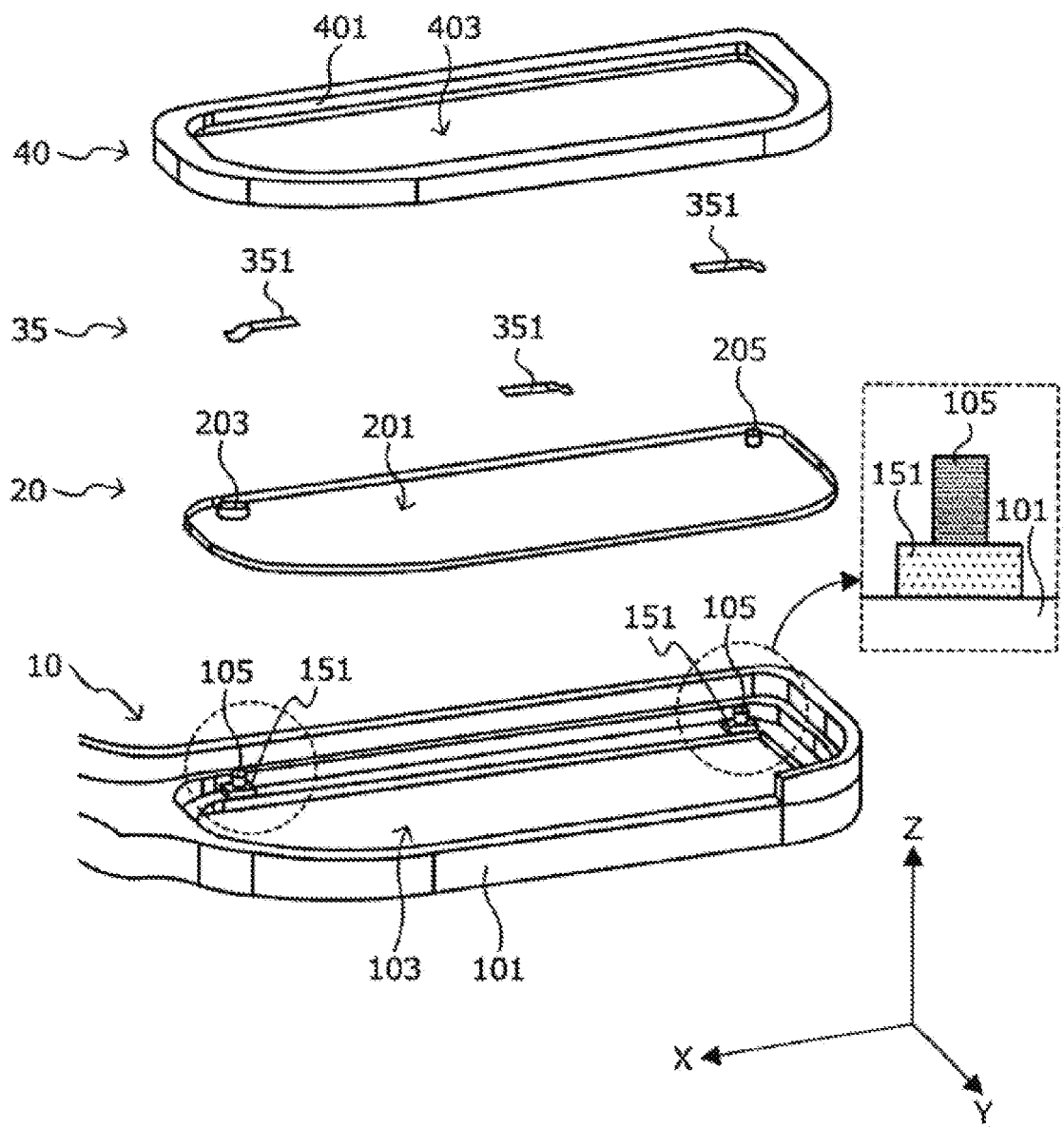

LIGHT-GUIDE TYPE DISPLAY DEVICE AND METHOD OF POSITIONING LIGHT GUIDE PLATE

CROSS REFERENCE TO RELATED APPLICATIONS

This application is a U.S. National Phase of International Patent Application No. PCT/JP2019/033287 filed on Aug. 26, 2019, which claims priority benefit of Japanese Patent Application No. JP 2018-170652 filed in the Japan Patent Office on Sep. 12, 2018. Each of the above-referenced applications is hereby incorporated herein by reference in its entirety.

TECHNICAL FIELD

The present disclosure relates to a light-guide type display device and a method of positioning a light guide plate.

BACKGROUND ART

Various image display devices have been proposed that optically guide a two-dimensional image generated by an image generator to a position of a pupil of a viewer through a light guide plate to allow the two-dimensional image to be viewed by the viewer.

Here, if the light guide plate as described above expands or contracts due to a temperature change, there occurs a change in optical guiding state of the two-dimensional image to cause the two-dimensional image to be optically guided to a position deviating from a position to which the image is originally intended to be guided, thus causing degradation of image quality of the two-dimensional image to be viewed by the viewer. To cope with this, techniques for suppressing expansion or contraction of the light guide plate associated with a temperature change have been proposed.

For example, PTL 1 and PTL 2 each propose a technique of fixing the light guide plate to a support member supporting the light guide plate by using a buffer (adhesive). According to PTL 1 and PTL 2, it is described that the buffer (adhesive) has a low elastic modulus and is able to conform to the expansion and contraction of the light guide plate associated with a temperature change, thus making it possible to suppress degradation of the image.

CITATION LIST

Patent Literature

PTL 1: Japanese Unexamined Patent Application Publication No. 2015-184560
PTL 2: Japanese Unexamined Patent Application Publication No. 2015-184561

SUMMARY OF THE INVENTION

Problems to be Solved by the Invention

However, in a case of using the technique disclosed in PTL 1 and PTL 2 described above, if there are variations in initial accuracy of the shape of the light guide plate, which are particularly noticeable when the light guide plate includes resin, it becomes necessary to correct the light guide plate to a stable shape in a bonding process using the buffer. This leads to complexity of equipment or a longer takt time.

Further, the softer the buffer, the smaller the stress acting on the light guide plate upon a temperature change. However, a soft buffer tends to have a low viscosity before curing, and is likely to squeeze out when the buffer is applied, thus making the bonding process difficult.

Further, upon occurrence of a temperature change, because there is a difference in linear expansion coefficient of about several tens of ppm between a support member which is expected to be rigid and the light guide plate (particularly the light guide plate including resin), it is difficult to conform to a change in the shape of the light guide plate only with the buffer having a low elastic modulus.

Thus, in view of the circumstances as described above, the present disclosure proposes a light-guide type display device and a method of positioning a light guide plate that make it possible to suppress degradation of image quality associated with a temperature change of the light guide plate in a simpler manner and with higher reliability.

Means for Solving the Problem

According to the present disclosure, provided is a light-guide type display device including a light guide plate that optically guides an image to a pupil of a viewer, and a support member that supports the light guide plate and is provided with two fixing members. The light guide plate includes a first opening section that has a first opening having a long axis and a short axis, and a second opening section that has a second opening having a shape different from that of the first opening and located on a line that passes through the first opening section and that is parallel to a long-axis direction of the first opening section. Each of the two fixing members is inserted into a corresponding one of the first opening section and the second opening section.

Further, according to the present disclosure, provided is a method of positioning a light guide plate, the method including: providing, in a light guide plate that optically guides an image to a pupil of a viewer, a first opening section that has a first opening having a long axis and a short axis, and a second opening section that has a second opening having a shape different from that of the first opening and located on a line that passes through the first opening section and that is parallel to a long-axis direction of the first opening section; providing fixing members at positions corresponding to the first opening section and the second opening section on a support member that supports the light guide plate; and mounting the light guide plate onto the support member to cause the respective fixing members to be inserted into the first opening section and the second opening section.

According to the present disclosure, each of the two fixing members provided on the support member is inserted into a corresponding one of the first opening section and the second opening section provided in the light guide plate, whereby the light guide plate is positioned on the support member.

Effect of the Invention

As described above, according to the present disclosure, it is possible to suppress degradation of image quality associated with a temperature change of the light guide plate in a simpler manner and with higher reliability.

It is to be noted that the above-described effects are not necessarily limitative. In addition to or in place of the above effects, any of the effects described in the present specification or other effects that are graspable from the present specification may be achieved.

BRIEF DESCRIPTION OF THE DRAWINGS

FIG. 1A is an explanatory diagram schematically illustrating an example of a light-guide type display device according to an embodiment of the present disclosure.

FIG. 1B is an explanatory diagram schematically illustrating an example of the light-guide type display device according to the same embodiment.

FIG. 2 is an exploded perspective diagram schematically illustrating an example of a structure of the light-guide type display device according to the same embodiment.

FIG. 3 is an explanatory diagram for explaining a light guide plate according to the same embodiment.

FIG. 4 is an explanatory diagram for explaining the light guide plate according to the same embodiment.

FIG. 5 is an explanatory diagram for explaining the light guide plate according to the same embodiment.

FIG. 6 is an explanatory diagram for explaining the light guide plate according to the same embodiment.

FIG. 7 is an explanatory diagram for explaining the light guide plate according to the same embodiment.

FIG. 8 is an explanatory diagram for explaining a case where an opening center of a second opening section is not located on a line that passes through an opening center of a first opening section and that is parallel to a long-axis direction of the first opening section.

FIG. 9A is an explanatory diagram for explaining the light guide plate according to the same embodiment.

FIG. 9B is an explanatory diagram for explaining the light guide plate according to the same embodiment.

FIG. 9C is an explanatory diagram for explaining the light guide plate according to the same embodiment.

FIG. 10 is an explanatory diagram for explaining the light-guide type display device according to the same embodiment.

FIG. 11 is an exploded perspective diagram schematically illustrating another example of the structure of the light-guide type display device according to the same embodiment.

MODES FOR CARRYING OUT THE INVENTION

The following describes a preferred embodiment of the present disclosure in detail with reference to the accompanying drawings. It is to be noted that, in the present specification and drawings, components that have substantially the same functional configuration are denoted by the same reference numerals, and thus redundant description thereof is omitted.

It is to be noted that the description is given in the following order.
1. Embodiment
  1.1. About Appearance Example of Light-guide Type Display Device
  1.2. About Configuration of Light-guide Type Display Device
    1.2.1. About Support Member
    1.2.2. About Light Guide Plate
    1.2.3. About Elastic Support Member
    1.2.4. About Second Support Member
    1.2.5. About Push-against Member
  1.3. About Modification Example of Light-guide Type Display Device
2. Conclusion Embodiment <About Appearance Example of Light-Guide Type Display Device>

First, an appearance example of a light-guide type display device according to an embodiment of the present disclosure will be described briefly with reference to FIGS. 1A and 1B. FIGS. 1A and 1B are explanatory diagrams schematically illustrating an example of the light-guide type display device according to the present embodiment.

The light-guide type display device according to the present embodiment is a display device that presents an image to a viewer by optically guiding the image to a position of a pupil of the viewer with use of a light guide plate. It is possible to implement such a light-guide type display device as a head-mounted display (Head Mounted Display: HMD) as schematically illustrated in FIGS. 1A and 1B, for example. Examples of such a head-mounted display include a head-mounted display with frames in the form of eyeglasses, as illustrated in FIGS. 1A and 1B.

The light-guide type display device 1 with frames in the form of eyeglasses according to the present embodiment at least includes, as illustrated in FIGS. 1A and 1B, the frames in the form of eyeglasses as an example of a support member 10, and a light guide plate 20 provided at a position corresponding to a lens part of the eyeglasses. Further, an image generation unit 3 that generates an image to be provided to the wearer is fixed to the support member 10. The image generation unit 3 is a unit including an image generation section (not illustrated) implemented by various types of light sources and optical elements, etc., or various types of displays such as an organic EL (Electro Luminescence) display or a liquid crystal display, and entrance optics (not illustrated) for allowing the generated image to enter the light guide plate 20.

It is possible for the light-guide type display device 1 according to the present embodiment to be a transmissive display device or a semi-transmissive (see-through type) display device. Specifically, it is possible for at least a portion of the light guide plate 20 facing the pupil of the wearer to have a transmissive property or semi-transmissive (see-through) property to enable the wearer to view an outside scene through such a portion of the light guide plate 20. In FIGS. 1A and 1B, the light-guide type display device 1 according to the present embodiment is illustrated as that of a binocular type provided with two image generation units 3 and two light guide plates 20; however, the light-guide type display device 1 according to the present embodiment may be of a monocular type provided with a single image generation unit 3 and a single light guide plate 20. Here, the term "semi-transmissive" above is used to mean that part of entering light is transmitted and the rest is reflected, not to mean that ½ (50%) of the entering light is transmitted or reflected.

Here, the material and shape of the support member 10 are not particularly limited, and any known shape may be formed using any known material. Further, regarding the image generation unit 3 also, there is no particular limitation and any known unit may be used as appropriate.

As schematically illustrated in FIG. 1B, the image formed by the image generation unit 3 fixed to the support member 10 enters a portion of the light guide plate 20 and is thereafter optically guided to the position of the pupil E of the wearer.

<About Configuration of Light-Guide Type Display Device>

In the following, a configuration of the light-guide type display device according to the present embodiment will be described in detail with reference to FIGS. 2, 3, 4, 5, 6, 7, 8, 9A, 9B, 9C, and 10.

FIG. 2 is an exploded perspective diagram schematically illustrating an example of a structure of the light-guide type display device according to the present embodiment. FIGS. 3 to 7 and FIGS. 9A, 9B, and 9C are explanatory diagrams for explaining the light guide plate according to the present embodiment. FIG. 8 is an explanatory diagram for explaining a case where an opening center of a second opening section is not located on a line that passes through an opening center of a first opening section and that is parallel to a long-axis direction of the first opening section. FIG. 10 is an explanatory diagram for explaining the light-guide type display device according to the present embodiment.

It is to be noted that FIGS. 2 to 10 schematically illustrate a portion corresponding to one eye (the right eye) extracted from the binocular light-guide type display device 1 as illustrated in FIGS. 1A and 1B. Further, in the following, description will be given with use of a coordinate system as illustrated in FIG. 2 for the sake of convenience. Further, the contents described below are also applicable similarly to a portion corresponding to the left eye.

The light-guide type display device 1 according to the present embodiment at least includes, as schematically illustrated in FIG. 2, the support member 10 and the light guide plate 20. Further, the light-guide type display device 1 according to the present embodiment preferably includes an elastic support member 30 and a second support member 40 in addition to the support member 10 and the light guide plate 20. Here, in FIG. 2, an X-axis direction corresponds to a long-axis direction of light guide plate 20 (a width direction of the light guide plate 20), a Y-axis direction corresponds to a height direction of the light guide plate 20, and a Z-axis direction corresponds to a thickness direction of the light guide plate 20.

[About Support Member 10]

The support member 10 is a member corresponding to a frame structure of the light-guide type display device 1 according to the present embodiment, and supports the light guide plate 20 described later. In FIG. 2, only a portion corresponding to a rim on the right-eye side of the frame structure is illustrated, and an end portion of the support member 10 on a negative X-axis direction side corresponds to an end piece part of the frame structure, with a component (not illustrated) corresponding to a temple being coupled thereto. Further, the image generation unit 3 (not illustrated) is fixed to the negative X-axis direction side of the support member 10.

Such a support member 10 includes a predetermined base 101. An opening section 103 is formed in a center portion of such a base 101, and the light guide plate 20 described later is disposed on a positive Z-axis direction side of such a base 101. A portion of the base 101 on which the light guide plate 20 is to be disposed is provided with a groove for assembling the light guide plate 20 thereto, and two fixing members 105 are provided on an attachment surface 107, which is a surface of the groove on a side to be in contact with the light guide plate 20. Each of the two fixing members 20 is inserted into a corresponding one of opening sections provided in the light guide plate 20 as will be described later. As a result, the light guide plate 20 is positioned with respect to the support member 10.

Here, the base 101 is formable using any of known materials such as various kinds of metals or alloys or various kinds of plastic resins, for example. Regarding the shape of the opening section 103 also, any shape is possible in accordance with the shape of the light guide plate 20.

The two fixing members 105 are members that function as fixing pins for determining the position of the light guide plate 20 on the support member 10. The fixing members 105 are provided to have an outer shape corresponding to an opening shape of a second opening section 205 of the light guide plate 20 described later. The fixing members 105 may include the same material as that of the base 101 or a material different from that of the base 101.

Further, regarding the support member 10 according to the present embodiment, a planarity of the light guide plate 20 to be attached often depends on a planarity of the attachment surface 107. Thus, in order to achieve a desired planarity with higher reliability, at least a portion of the attachment surface 107 that is to be in contact with the light guide plate 20 is preferably subjected to at least any one of mirror finishing, ceramic coating, fluororesin coating, a nickel plating process, and a PIP (Power Impact Plating) process. By performing the above-described processing, the planarity of the light guide plate 20 to be attached is ensured with higher reliability, and in addition, as will be described later, the light guide plate 20 becomes more easily slidable on the attachment surface 107 of the support member 10 when the light guide plate 20 expands or contracts in response to a temperature change.

[About Light Guide Plate 20]

The light guide plate 20 is a member that optically guides an image (more specifically, an image generated at the non-illustrated image generation unit 3) to the pupil of the viewer. The light guide plate 20 is provided on the positive Z-axis direction side of the support member 10. The light guide plate 20 includes: a base 201 including a predetermined material such as one that expands or contracts in response to a temperature change; and two opening sections provided in the base 201 and having opening shapes different from each other. The two opening sections are formed in the base 201 to correspond to positions on the support member 10 at which the two fixing members 105 are provided.

In the following, a configuration of such a light guide plate 20 will be described in more detail with reference to FIGS. 3 to 9C. It is to be noted that in FIGS. 3 to 9C, a shape of the light guide plate 20 illustrated in FIG. 2 as viewed from the positive Z-axis direction side is illustrated as a substantially rectangular shape in schematic representation.

The light guide plate 20 according to the present embodiment includes, as illustrated in FIG. 3, the base 201, and one each of a first opening section 203 and the second opening section 205 provided in the base 201. In addition, it is preferable that the light guide plate 20 according to the present embodiment further include a first holographic optical element (Holographic Optical Element: HOE) 211 and a second holographic optical element 213.

As the base 201 of the light guide plate 20, it is possible to use various known materials without particular limitation. Examples of such materials include transparent glass substrates including soda-lime glass, waterwhite glass and the like, optical glasses including silica glass, BK7 and the like, plastic substrates, plastic sheets, plastic films, and the like. Here, examples of plastics include polyethylene terephthalate, polyethylene naphthalate, polycarbonate, cellulose esters such as cellulose acetate, fluoropolymers such as a copolymer of polyvinylidene fluoride or polytetrafluoroethylene and hexafluoropropylene, polyethers such as polyoxymethylene, polyolefins such as polyacetal, polystyrene, polyethylene, polypropylene, or methylpentene polymers, polyimides including polyamide imide or polyether imide and the like, polyamides, polyethersulfone, polyphenylene sulfide, polyvinylidene fluoride, tetraacetylcellulose, brominated phenoxy, polyarylate, polysulfone, PMMA, acrylic-based resin, cycloolefin polymer (COP) resin, and the like. Further, the plastic sheets and the plastic films may have rigidity to be hard to bend, or may have flexibility.

The first opening section 203 is an opening section that has a first opening having a long axis and a short axis. Examples of such a first opening include an opening having an opening shape with an aspect ratio exceeding 1. In the following, the first opening will be described with use of aspect ratio; however, such an aspect ratio is used for the sake of convenience for explaining the opening shape of the first opening. Here, the aspect ratio stands for a value (d1/d2) obtained by dividing a maximum width d1 of the opening in the long-axis direction by a maximum width d2 of the opening in a short-axis direction. Examples of such an opening shape include an oval shape as illustrated in FIGS. 3 and 4.

Further, the second opening section 205 is an opening section that has a shape different from the first opening described above. Examples of such a shape different from the first opening include an opening shape with an aspect ratio higher than or equal to 1 and lower than the aspect ratio that the first opening has, and an opening shape with an aspect ratio of 1. In the following, the second opening will also be described with use of aspect ratio; however, such an aspect ratio is used for the sake of convenience for explaining the opening shape of the second opening. In the example illustrated in FIG. 4, the second opening section 205 is in the shape of a circle having a diameter of d2.

Here, the dimension d2 in the short-axis direction of the first opening section 203 as described above may be, as illustrated in FIG. 4, equal to the dimension d2 of the second opening section 205, and the dimension d1 in the long-axis direction of the first opening section 203 may be larger than the dimension d2 of the second opening section 205. It is to be noted that d1 and d2 being equal includes not only a case where the dimensions of d1 and d2 are perfectly identical to each other but also a case where they can be regarded as being equal within a range of errors in design and manufacture.

Such first opening section 203 and second opening section 205 are provided in a region in the vicinity of a long side of a substantially rectangular outer shape of the light guide plate 20, and along such a long side. It is to be noted that the dimensions of d1 and d2 as described above are not particularly limited and may be appropriately set in accordance with the dimensions of the light guide plate 20; however, it is preferable that the dimensions of d1 and d2 fall within a range from about several μm to about several tens of μm, for example.

Here, in the light guide plate 20 according to the present embodiment, the second opening of the second opening section 205 is located on a line that passes through the first opening section 203 and that is parallel to the long-axis direction of the first opening section 203. More preferably, when a line that passes through an opening center (point A in FIG. 4) of the first opening section 203 and that is parallel to the long-axis direction (the X-axis direction in FIG. 4) of the first opening section 203 is denoted as a straight line L, an opening center (point B in FIG. 4) of the second opening section 205 is located on the straight line L.

As previously described, in the support member 10 according to the present embodiment, the outer shape of the fixing members 105 functioning as fixing pins is formed into a shape corresponding to the opening shape of the second opening section 205. For example, in a case of the second opening section 205 as illustrated in FIG. 4, the outer shape (more specifically, a shape of a cut surface in an XY plane) of the fixing members 105 of the support member 10 is circular. In the light-guide type display device 1 according to the present embodiment, the light guide plate 20 is positioned on the support member 10 by attaching the light guide plate 20 to the support member 10 to cause the two fixing members 105 of the support member 10 to be inserted into the respective openings of the first opening section 203 and the second openings 205. The position of the light guide plate 20 in the XY plane is thereby determined. Further, in the present embodiment, in order to allow expansion or contraction of the light guide plate 20 associated with a temperature change, as described below, no adhesive is used in bonding the light guide plate 20 to the support member 10. This simplifies the assembling process and thereby makes it possible to achieve simplification of equipment and a reduction of takt time.

Further, in the light guide plate 20 according to the present embodiment, the first opening and the second opening have opening shapes different from each other. For example, the second opening section 205 has an opening section having an aspect ratio of 1, whereas the first opening section 203 has an opening section having an aspect ratio exceeding 1. Accordingly, as schematically illustrated in FIG. 5, upon insertion of the fixing members 105 into the first opening section 203 and the second opening section 205, a gap as small as no more than a margin anticipated in designing the second opening section 205 can be generated between the second opening section 205 and the fixing member 105, whereas a space sp is generated between the first opening section 203 and the fixing member 105 along a direction in which the straight line L extends.

Here, the opening shapes of the first opening section 203 and the second opening section 205 are not limited to, for example, an oval shape and a circular shape as illustrated in FIG. 4, and other opening shapes may be provided as long as the opening shapes satisfy the relationship described above. For example, as schematically illustrated in FIG. 6, the opening shape of the first opening section 203 may be rectangular, and the opening shape of the second opening section 205 may be square.

In the light guide plate 20 according to the present embodiment, because the first opening section 203 and the second opening section 205 have the above-described characteristics, even in a case where a temperature change occurs in an environment in which the light guide plate 20 is present and the light guide plate 20 thereby expands or contracts, the direction of expansion/contraction of the light guide plate 20 is defined into a specific direction. Such an expansion/contraction of the light guide plate 20 associated with a temperature change will be described anew in detail later.

Returning again to FIG. 3, the first holographic optical element (HOE) 211 and the second holographic optical element (HOE) 213 will be described.

The holographic optical elements (HOEs) are optical elements that have an optical property of selectively diffracting only a specific wavelength depending on an entry angle of a light beam and transmitting the rest. By using such HOEs, it is possible to optically guide the image generated at the image generation unit 3 to the pupil of the wearer.

The first HOE 211 is provided on the light guide plate 20 to cover a position at which the image generated at the image generation unit 3 is to enter the light guide plate 20. The second HOE 213 is provided on the light guide plate 20 to cover a range over which the pupil of the wearer is able to view (pupil's viewing range). The shape of the first HOE 211 is not particularly limited, and may be appropriately set in accordance with the dimensions or the like of the image generated at the image generation unit 3. Further, the shape of the second HOE 213 is not particularly limited, either, and may be appropriately set in accordance with the shape or the like of the pupil's viewing range of the viewer assumed. However, in the light guide plate 20 according to the present embodiment, it is preferable that the dimensions of the first HOE 211 and the second HOE 213 be set in consideration of the magnitude of expansion or contraction of the light guide plate 20 associated with a temperature change. Such a method of setting the dimensions of the HOEs will be described anew later.

About Expansion/Contraction of Light Guide Plate Associated with Temperature Change Here, with reference to FIGS. 7 and 8, a description will be given of the case where a temperature change occurs in the environment in which the light guide plate 20 is present and the light guide plate 20 thereby expands or contracts.

The second opening section 205 functions as a positioning hole of the light guide plate 20, and no movement of the light guide plate 20 occurs in the vicinity of the second opening section 205, whereas in the first opening section 203, because there is the space sp as illustrated in FIG. 5, the light guide plate 20 is able to expand or contract along the direction of extension of the straight line L. In a case of the example illustrated in FIG. 7, because the straight line L is parallel to the X-axis direction, the light guide plate 20 is able to expand or contract along the X-axis direction. Further, as schematically illustrated in FIG. 7, the light guide plate 20 is also able to expand or contract along a direction orthogonal to the straight line L (in the case of FIG. 7, the Y-axis direction). Therefore, assuming that the light guide plate 20 as illustrated in upper part of FIG. 7 expands, the light guide plate 20 expands along a positive X-axis direction and a positive Y-axis direction. Similarly, assuming that the light guide plate 20 contracts, the light guide plate 20 contracts along the negative X-axis direction and a negative Y-axis direction.

As described above, the light-guide type display device 1 according to the present embodiment is structured to allow expansion or contraction in the XY plane of the light guide plate 20 associated with a temperature change, and therefore, even in the case where a temperature change occurs, the light guide plate 20 undergoes no deflection. In this way, by suppressing the occurrence of a deflection of the light guide plate 20, it is possible for the light guide plate 20 to maintain the image quality even in the case where a temperature change occurs. Further, in order to suppress the occurrence of such a deflection with higher reliability, it is preferable that one each of the first opening section 203 and the second opening section 205 be provided for the light guide plate 20.

In addition, by further providing the elastic support member 30 and the second support member 40 as described later on the positive Z-axis direction side of the light guide plate 20, it becomes possible to prevent the occurrence of a deflection of the light guide plate 20 associated with a temperature change with higher reliability, and it is thus possible to suppress degradation of image quality associated with a temperature change with higher reliability.

Here, in FIG. 7, an optical axis of the image generation unit 3 as illustrated in FIG. 3 is described as "optical center", and a centerline in the two HOEs 211 and 213 is described as "HOE center". As illustrated in the upper part of FIG. 7, in the light guide plate 20 in a case where no expansion or contraction occurs, a line segment corresponding to the optical center and a line segment corresponding to the HOE center coincides with each other, and thus no degradation of image quality occurs.

In contrast, upon expansion or contraction of the light guide plate 20, the position of the optical center does not change because the image generation unit 3 is attached to the support member 10, whereas the position of the HOE center changes with the expansion or contraction of the light guide plate 20. In a case of the example illustrated in a lower part of FIG. 7, an expansion of the light guide plate 20 causes the position of the HOE center to move toward the positive Y-axis direction side. As a result, a misalignment between the optical center and the HOE center occurs with the expansion or contraction of the light guide plate 20.

Assume that the light guide plate 20 has a length in the X-axis direction of 70 mm and that the 70-mm-long light guide plate 20 is formed with the base 201 (for example, cycloolefin resin or the like) that expands by 84 μm toward the positive X-axis direction side upon a temperature change ΔT=20° C. Assuming that a length in the Y-axis direction of the light guide plate 20 is 35 mm, i.e., one half the length in the X-axis direction, an amount of expansion of the light guide plate 20 having a dimension of 35 mm toward the positive Y-axis direction side is: 84 μm×(½)=42 μm. Here, assume that each of the first HOE 211 and the second HOE 213 expands by an amount of expansion substantially the same as that of the base 201. In this case, if the first HOE 211 and the second HOE 213 are designed with margins of 84 μm on the positive X-axis direction side, 84 μm on the negative X-axis direction side, 42 μm on the positive Y-axis direction side, and 42 μm on the negative Y-axis direction side, even in a case where a misalignment of the HOE center occurs, it is possible to eliminate an influence of the foregoing misalignment of the HOE center. Further, it is preferable that the dimensions of the space sp in the first opening section 203 as illustrated in FIG. 5 be set also in consideration of the amount of expansion as described above.

It is to be noted that in considering the misalignment of the center positions due to the expansion or contraction as described above, it is more preferable, from the viewpoint of maintaining the image quality, that expansion or contraction be prevented as much as possible on a side of the light guide plate 20 closer to a position where the image from the image generation unit 3 enters. It is therefore preferable that in the light guide plate 20, the second opening section 205 which functions as a positioning hole be located on the side of the light guide plate 20 closer to the position where the image enters. In the case of the example illustrated in FIG. 7, etc., it is preferable that the second opening section 205 be located in an end region of the light guide plate 20 on the negative X-axis direction side.

The above-described state of expansion or contraction of the light guide plate 20 is generated because the first opening of the first opening section 203 and the second opening of the second opening section 205 are present in the same straight line form (for example, the opening center of the first opening section 203 and the opening center of the second opening section 205 are present on the straight line L). A case will be considered where, as some posit, the opening center of the first opening section 203 and the opening center of the second opening section 205 are not present on the same straight line L, as illustrated in an upper part of FIG. 8. In this case, if the light guide plate 20 undergoes an expansion or contraction associated with a temperature change, a rotation mode occurs in the light guide plate 20 because a compressive stress or contraction stress applied to the first opening section 203 includes each of an X-axis direction component and a Y-axis direction component. As a result, as illustrated in a lower part of FIG. 8, the light guide plate 20 tilts after the expansion or contraction, resulting in a possibility that the image to be provided to the wearer tilts, which is not favorable. The opening center of the first opening section 203 and the opening center of the second opening section 205 being present on the same straight line L makes it possible to avoid the occurrence of the rotation mode as described above, thus making it possible to maintain the image quality. Further, in order to avoid the occurrence of such a rotation mode with higher reliability, it is preferable that a separation distance D between the opening center (point A) of the first opening section 203 and the opening center (point B) of the second opening section 205 as illustrated in FIGS. 4 and 6 be as large as possible.

In the light guide plate 20 according to the present embodiment, the positions of the first opening section 203 and the second opening section 205 are not limited to the example illustrated in FIG. 3, etc. In the following, an arrangement example of the first opening section 203 and the second opening section 205 will be described briefly with reference to FIGS. 9A, 9B, and 9C.

FIG. 3, etc. illustrate the case where the first opening section 203 and the second opening section 205 are provided in the region in the vicinity of the long side of the substantially rectangular outer shape of the light guide plate 20, and along such a long side; however, the first opening section 203 and the second opening section 205 may be provided in a region in the vicinity of a short side of the substantially rectangular outer shape of the light guide plate 20, and along such a short side.

Further, as illustrated in, for example, FIG. 9B, the first opening section 203 and the second opening section 205 may be provided on a centerline in a direction orthogonal to the long-axis direction in the light guide plate 20. In other words, in FIG. 9B, the first opening section 203 and the second opening section 205 may be provided on the centerline in the Y-axis direction which is a direction orthogonal to the long-axis direction. In this case, it is possible to suppress the degradation of image quality with higher reliability because no misalignment occurs between the optical center and the HOE center described above before and after expansion or contraction.

Further, as illustrated in, for example, FIG. 9C, in the light guide plate 20 having the substantially rectangular outer shape, the first opening section 203 and the second opening section 205 may be provided on either diagonal line. The arrangement example illustrated in FIG. 9C also makes it possible to suppress the occurrence of the rotation mode resulting from expansion or contraction, thus making it possible to suppress degradation of image quality associated with a temperature change of the light guide plate 20.

The light guide plate 20 according to the present embodiment has been described in detail above with reference to FIGS. 3 to 9C.

[About Elastic Support Member 30]

Returning to FIG. 2 again, a description will be given of the elastic support member 30 that is preferably provided in the light-guide type display device 1 according to the present embodiment.

The elastic support member 30 according to the present embodiment is a member that is located on a surface of the light guide plate 20 opposite to the support member 10 and supports a portion of the light guide plate 20 by elasticity that the elastic support member 30 exhibits. Such an elastic support member 30 is provided on the surface of the light guide plate 20 opposite to the support member 10 without using an adhesive. By such an elastic support member 30, the light guide plate 20 is pressed against the attachment surface 107 of the support member 10, and the position of the light guide plate 20 in the thickness direction (the position in the Z-axis direction in FIG. 2) is fixed. Further, by providing such an elastic support member 30, it is possible to suppress deflection of the light guide plate 20 in the thickness direction of the light guide plate 20 occurring in response to a temperature change. Here, it is preferable that the elastic support member 30 according to the present embodiment be provided not to hinder the expansion or contraction of the light guide plate 20 associated with a temperature change.

For example, in the example illustrated in FIG. 2, the elastic support member 30 includes a base 301 including a material having low sliding resistance, and an opening section 303 is provided in the base 301. As illustrated in FIG. 2, such a base 301 having the opening section 303 supports the light guide plate 20 along an edge of the light guide plate 20. The elastic support member 30 including a material having low sliding resistance presses the light guide plate 20 by surface contact, thereby fixing the position of the light guide plate 20 in the Z-axis direction without hindering the expansion or contraction of the light guide plate 20 in the XY plane.

Here, the material having low sliding resistance used for the base 301 is not particularly limited, and a known material is usable. Examples of such a material having low sliding resistance include various resin materials including epoxy resins, modified silicone resins, epoxy-modified silicone resins, urethane resins, and the like.

[About Second Support Member 40]

As illustrated in FIG. 2, it is preferable that the second support member 40 be provided further above (on the positive Z-axis direction side of) the elastic support member 30. Such a second support member 40 functions as a so-called inner frame of the support member 10, and fixes the light guide plate 20 and the elastic support member 30 by being combined with the support member 10. Such a second support member 40 includes a predetermined base 401, and an opening section 403 is formed in a central portion of such a base 401.

Here, the base 401 is formable using a material similar to that of the support member 10, for example, and is formable using any of known materials such as various kinds of metals or alloys or various kinds of plastic resins, for example. Further, regarding the shape of the opening section 403 also, any shape is possible in accordance with the shape of the light guide plate 20.

[Push-Against Member 50]

Next, a push-against member 50 will be described with reference to FIG. 10.

In the light-guide type display device 1 according to the present embodiment, between the support member 10 and the light guide plate 20, there may be provided the push-against member 50 that pushes against the light guide plate 20 from outside the light guide plate 20 toward a planar direction of the light guide plate 20 to thereby bring the light guide plate 20 toward a predetermined direction.

In designing and manufacturing the light guide plate 20 according to the present embodiment, the dimensions (in particular, the dimensions in the Y-axis direction) of the first opening section 203 and the second opening section 205 are set to be larger than the dimensions of the fixing members 105 of the support member 10 by several tens of μm. This actually results in a small gap between each of the first opening section 203 and the second opening section 205 and a corresponding one of the fixing members 105.

Hence, for example, as illustrated in FIG. 10, by providing the push-against members 50 at an end portion on the negative X-axis direction side of the light guide plate 20 and an end portion on the negative Y-axis direction side thereof, it is possible to eliminate misalignment between each of the first opening section 203 and the second opening section 205 and the corresponding one of the fixing members 105. This makes it possible to further improve the positioning accuracy of the light guide plate 20.

Such a push-against member 50 is formable using, for example, a material having an elastic force such as a leaf spring, and the specific shape of the push-against member 50 is not limited to the example illustrated in FIG. 10.

The light-guide type display device 1 according to the present embodiment has been described in detail above with reference to FIGS. 2 to 10.

<About Modification Example of Light-Guide Type Display Device 1>

Next, a modification example of the light-guide type display device 1 according to the present embodiment will be described briefly with reference to FIG. 11. FIG. 11 is an exploded perspective diagram schematically illustrating another example of the structure of the light-guide type display device according to the present embodiment.

FIG. 2 illustrates the case where the light guide plate 20 according to the present embodiment is pressed toward the negative Z-axis direction side by the elastic support member 30 supporting the light guide plate 20 along the edge of the light guide plate 20. However, the elastic support member for supporting the light guide plate may be a point-contact type elastic support member 35 that supports at least three points of the end region of the light guide plate 20 as illustrated in FIG. 11.

Such an elastic support member 35 includes at least three or more elastic bodies 351. A material of the elastic bodies 351 is not particularly limited, and it is possible to use a known elastic body such as a leaf spring or the like, for example.

In the present modification example, it is preferable that two of the at least three or more elastic bodies 351 be disposed to support the positions in the light guide plate 20 at which the first opening section 203 and the second opening section 205 are present, as illustrated in FIG. 11. In this case, as illustrated in FIG. 11, it is preferable that the fixing members 105 of the support member 10 be placed on pedestals 151 provided on the support member 10, and the planarity be ensured. In addition, for a portion where the rest of the elastic bodies 351 is to be disposed, it is preferable that a pedestal (not illustrated) having an appropriate height be provided on the support member 10 to ensure the planarity of the light guide plate 20.

By configuring the elastic support member 35 using such at least three or more elastic bodies 351, it is possible to reduce a contact area between the elastic support member 35 and the light guide plate 20, which makes it possible to reduce the sliding resistance between the elastic support member 35 and the light guide plate 20.

The modification example of the light-guide type display device 1 according to the present embodiment has been described briefly above with reference to FIG. 11.

<About Method of Positioning Light Guide Plate>

Next, a method of positioning the light guide plate in the light-guide type display device 1 according to the present embodiment as described above will be described briefly.

The method of positioning the light guide plate according to the present embodiment includes: providing, in the light guide plate 20 that optically guides an image to a pupil of a viewer, the first opening section 203 that has the first opening having the long axis and the short axis, and the second opening section 205 that has the second opening having a shape different from that of the first opening and located on a line that passes through the first opening section 203 and that is parallel to the long-axis direction of the first opening section 203; providing the fixing members 105 at positions corresponding to the first opening section 203 and the second opening section 205 on the support member 10 that supports the light guide plate 20; and mounting the light guide plate 20 onto the support member 10 to cause the respective fixing members 105 to be inserted into the first opening section 203 and the second opening section 205.

By the method described above, the light guide plate 20 is positioned with respect to the support member 10 in the light-guide type display device 1 according to the present embodiment. It is to be noted that the method of positioning the light guide plate according to the present embodiment is applicable to display devices that use light guide plates of various known systems.

CONCLUSION

As described above, the light-guide type display device 1 according to the embodiment of the present disclosure includes the light guide plate 20 including the first opening section 203 and the second opening section 205 that are provided while maintaining specific shapes and a specific positional relationship. By virtue of this, even in the case where the environment in which the light guide plate 20 is present changes in temperature, the light guide plate 20 expands or contracts in a plane, and no deflection occurs in the light guide plate 20. As a result, the light-guide type display device 1 according to the embodiment of the present disclosure is able to maintain excellent image quality.

In addition, because no bonding process is necessary for attachment of the light guide plate 20, it is possible to achieve simplification of manufacturing equipment, and it is also possible to reduce manufacturing cost by shortening the takt time.

While the preferred embodiment of the present disclosure has been described above in detail with reference to the accompanying drawings, the technical scope of the present disclosure is not limited to such an embodiment. It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

In addition, the effects described herein are merely illustrative or exemplary, and are non-limiting. That is, the technology according to the present disclosure may achieve other effects that are apparent to those skilled in the art from the description herein, in addition to the effects described above or in place of the effects described above.

It is to be noted that the following configurations are also encompassed by the technical scope of the present disclosure.

(1)

A light-guide type display device including:
a light guide plate that optically guides an image to a pupil of a viewer; and
a support member that supports the light guide plate and is provided with two fixing members, in which
the light guide plate includes
a first opening section that has a first opening having a long axis and a short axis, and
a second opening section that has a second opening having a shape different from that of the first opening and located on a line that passes through the first opening section and that is parallel to a long-axis direction of the first opening section, and
each of the two fixing members is inserted into a corresponding one of the first opening section and the second opening section.

(2)

The light-guide type display device according to (1), in which the two fixing members provided in the support member have a shape corresponding to an opening shape of the second opening section.

(3)

The light-guide type display device according to (1) or (2), in which one each of the first opening section and the second opening section is provided for the light guide plate.

(4)

The light-guide type display device according to any one of (1) to (3), in which in the light guide plate, the second opening section is located on a side closer to a position at which the image enters the light guide plate.

(5)

The light-guide type display device according to (4), further including an image generation unit that generates the image, in which
the image generation unit is fixed to the support member, and
the second opening section is provided on a side where the image generation unit is located.

(6)

The light-guide type display device according to any one of (1) to (5), in which
the light guide plate has a substantially rectangular outer shape when the light guide plate is viewed from above in a surface normal direction of the light guide plate, and
the first opening section and the second opening section are provided in a region in a vicinity of any side of the substantially rectangular outer shape and along the side.

(7)

The light-guide type display device according to any one of (1) to (5), in which
the light guide plate has a substantially rectangular outer shape when the light guide plate is viewed from above in a surface normal direction of the light guide plate, and
the first opening section and the second opening section are provided on either diagonal line of the substantially rectangular outer shape.

(8)

The light-guide type display device according to any one of (1) to (5), in which when the light guide plate is viewed from above in a surface normal direction of the light guide plate, the first opening section and the second opening section are provided on a centerline in a direction orthogonal to the long-axis direction in the light guide plate.

(9)

The light-guide type display device according to any one of (1) to (8), further including:
an elastic support member that supports a portion of the light guide plate; and
a second support member that fixes the light guide plate and the elastic support member by being combined with the support member,
in which the elastic support member and the second support member are provided on a surface of the light guide plate opposite to the support member in order from a side of the light guide plate.

(10)

The light-guide type display device according to (9), in which the elastic support member supports the light guide plate along an edge of the light guide plate.

(11)

The light-guide type display device according to (10), in which a surface of the support member in contact with the light guide plate has been subjected to at least any one of mirror finishing, ceramic coating, fluororesin coating, a nickel plating process, and a PIP (Power Impact Plating) process.

(12)

The light-guide type display device according to (9), in which the elastic support member supports at least three points of an end region of the light guide plate.

(13)

The light-guide type display device according to any one of (1) to (12), further including a push-against member between the support member and the light guide plate, the push-against member pushing against the light guide plate from outside the light guide plate toward a planar direction of the light guide plate to thereby bring the light guide plate toward a predetermined direction.

(14)

The light-guide type display device according to any one of (1) to (13), in which the light guide plate includes a material that expands or contracts in response to a temperature change.

(15)

The light-guide type display device according to (14), in which the light guide plate is a light guide plate including resin.

(16)

The light-guide type display device according to any one of (1) to (15), functioning as a head-mounted display.

(17)

A method of positioning a light guide plate, including:
providing, in a light guide plate that optically guides an image to a pupil of a viewer, a first opening section that has a first opening having a long axis and a short axis, and a second opening section that has a second opening having a shape different from that of the first opening and located on a line that passes through the first opening section and that is parallel to a long-axis direction of the first opening section;
providing fixing members at positions corresponding to the first opening section and the second opening section on a support member that supports the light guide plate; and

REFERENCE SIGNS LIST

1: light-guide type display device
3: image generation unit
10: support member
20: light guide plate
30, 35: elastic support member
40: second support member
50: push-against member
101: base
103, 303, 403: opening section
105: fixing member
107: attachment surface
201: base
203: first opening section
205: second opening section
211: first holographic optical element (HOE)
213: second holographic optical element (HOE)
301, 401: base
351: elastic body

The invention claimed is:

1. A light-guide type display device, comprising:
a light guide plate that optically guides an image to a pupil of a viewer;
a support member that supports the light guide plate and is provided with two fixing members, wherein the light guide plate includes
 a first opening section that has a first opening having a long axis and a short axis, and
 a second opening section that has a second opening, which is a positioning hole of the light guide plate, having a shape different from that of the first opening and located on a line that passes through the first opening section and that is parallel to a long-axis direction of the first opening section, and each of the two fixing members is inserted into a corresponding one of the first opening section and the second opening section; and
a push-against member between the support member and the light guide plate, wherein the push-against member pushing against the light guide plate from outside the light guide plate toward a planar direction of the light guide plate to thereby bring the light guide plate towards a specific direction.

2. The light-guide type display device according to claim 1, wherein the two fixing members provided in the support member have a shape corresponding to the shape of the second opening of the second opening section.

3. The light-guide type display device according to claim 1, wherein one each of the first opening section and the second opening section is provided for the light guide plate.

4. The light-guide type display device according to claim 1, wherein in the light guide plate, the second opening section is located on a side closer to a position at which the image enters the light guide plate.

5. The light-guide type display device according to claim 4, further comprising an image generation unit configured to generate the image, wherein the image generation unit is fixed to the support member, and
the second opening section is provided on a side of the light guide plate where the image generation unit is located.

6. The light-guide type display device according to claim 1, wherein
the light guide plate has a substantially rectangular outer shape when the light guide plate is viewed from above in a surface normal direction of the light guide plate, and
the first opening section and the second opening section are provided in a region in a vicinity of a side of the substantially rectangular outer shape and along the side of the substantially rectangular outer shape.

7. The light-guide type display device according to claim 1, wherein
the light guide plate has a substantially rectangular outer shape when the light guide plate is viewed from above in a surface normal direction of the light guide plate, and
the first opening section and the second opening section are provided on either diagonal line of the substantially rectangular outer shape.

8. The light-guide type display device according to claim 1, wherein when the light guide plate is viewed from above in a surface normal direction of the light guide plate, the first opening section and the second opening section are provided on a centerline in a direction orthogonal to the long-axis direction in the light guide plate.

9. The light-guide type display device according to claim 1, further comprising:
an elastic support member that supports a portion of the light guide plate; and
a second support member that fixes the light guide plate and the elastic support member by being combined with the support member,
 wherein the elastic support member and the second support member are provided on a surface of the light guide plate opposite to the support member in order from a side of the light guide plate.

10. The light-guide type display device according to claim 9, wherein the elastic support member supports the light guide plate along an edge of the light guide plate.

11. The light-guide type display device according to claim 10, wherein a surface of the support member in contact with the light guide plate has been subjected to at least one of mirror finishing, ceramic coating, fluororesin coating, a nickel plating process, or a PIP (Power Impact Plating) process.

12. The light-guide type display device according to claim 9, wherein the elastic support member supports at least three points of an end region of the light guide plate.

13. The light-guide type display device according to claim 1, wherein the light guide plate includes a material that expands or contracts in response to a temperature change.

14. The light-guide type display device according to claim 13, wherein the light guide plate includes a resin.

15. The light-guide type display device according to claim 1, wherein the light-guide type display device is a head-mounted display.

16. A method of positioning a light guide plate, comprising:
providing, in the light guide plate that optically guides an image to a pupil of a viewer, a first opening section that has a first opening having a long axis and a short axis, and a second opening section that has a second opening, which is a positioning hole of the light guide plate, having a shape different from that of the first opening mounting the light guide plate onto the support member to cause the respective fixing members to be inserted into the first opening section and the second opening section.

and located on a line that passes through the first opening section and that is parallel to a long-axis direction of the first opening section;

providing fixing members at positions corresponding to the first opening section and the second opening section on a support member that supports the light guide plate;

mounting the light guide plate onto the support member to cause the respective fixing members to be inserted into the first opening section and the second opening section; and providing a push-against member between the support member and the light guide plate for pushing against the light guide plate from outside the light guide plate toward a planar direction of the light guide plate to thereby bring the light guide plate towards a specific direction.

* * * * *